May 28, 1940. G. C. SUPPLEE ET AL 2,202,611

METHOD OF IRRADIATING LIQUIDS

Filed Jan. 28, 1939

INVENTORS
GEORGE C. SUPPLEE
MERRILL J. DORCAS
BY
Paul R. Ames
ATTORNEY

Patented May 28, 1940

2,202,611

UNITED STATES PATENT OFFICE 2,202,611

METHOD OF IRRADIATING LIQUIDS

George C. Supplee, Bainbridge, N. Y., and Merrill J. Dorcas, Berea, Ohio, assignors of one-half to The Borden Company, a corporation of New Jersey, and one-half to National Carbon Company, Inc., a corporation of New York Application January 28, 1939, Serial No. 253,414

13 Claims. (Cl. 250—49)

This application is a continuation in part of our copending application Serial No. 690,411, filed September 21, 1933.

This invention relates to the treatment of liquids with radiant energy, such, for example, as the treatment of milk with ultra-violet radiation, for the purpose of increasing the antirachitic properties of the milk or for affecting its bacterial content.

In irradiating liquids, it is important that the effect of the radiant energy be uniformly distributed throughout the liquid and that this effect be produced to the proper degree. For example, in milk it is important that substantially all the milk be acted upon by the ultra-violet energy. It is equally desirable that no substantial portion of the milk be excessively exposed to the ultra-violet rays because such excessive exposure would produce undesirable changes that would not be counteracted by dilution with unexposed milk. Examples of such undesirable changes are the formation of undesirable flavor or odor and the destruction of the antirachitic substance, known as vitamin D, by prolonged exposure to the radiation similar to that which originally activated it; other vitamins, such as vitamins A and C, may also be destroyed by prolonged exposure. It is also desirable that the irradiation be carried through with the minimum amount of apparatus and with the minimum expenditure of energy.

It is well known that exposure of milk, for instance, to ultra-violet energy results in the development of antirachitic properties in the milk. This is frequently done by exposing milk to ultra-violet energy in the form of a film over a supporting surface. The object of exposing the milk in the form of a film is to provide a large surface for ultra-violet to act on, since it is believed that milk is comparatively opaque to ultra-violet radiation.

We have found that there is a definite relation between the intensity and quality of the incident radiation, the capacity and character of the film of milk, the time of exposure required to produce a given degree of antirachitic potency and the extent of the undesirable results produced by excessive irradiation. We have found that these values are limited by commercial considerations. For instance, the ultra-violet radiation must be of a kind and intensity which is obtainable with the conveniently available sources of ultra-violet; the undesirable flavor or odor must be absent or within the fixed limits imposed by trade requirements; and the fixed concentration of the antirachitic substance or the fixed antirachitic potency must be such as are necessary for successful clinical results with the use of irradiated vitamin D milk. Even within these commercially imposed limitations it is possible to carry out the radiation process with a wide range of types and thicknesses of milk film co-related with the intensity and character of the incident radiation, but we have also found that for a given set of required or fixed conditions there are certain types of films and limits of conditions to these films which accomplish the desired results with the least expenditure of ultra-violet energy, with minimum apparatus, with greatest margin of freedom from undesirable flavor or odor or both, and least danger of lack of sufficient antirachitic potency.

An object of our invention is to provide a method for activating or otherwise treating liquids in which the character of the film being irradiated is maintained at the proper capacity and of such character that uniform and maximum exposure of the components of the liquid are obtained during a minimum period of time and with the minimum of undesirable changes in the liquid. Another object of our invention is to provide a film of liquid of such capacity and character, while being irradiated or otherwise treated, that the area of the screen over which the film is flowing is reduced to a minimum compatible with the maximum exposure of the components to the incident radiation. These and other objects of our invention will be evident from the following specification, having reference to the annexed drawing in which:

Figure 1:
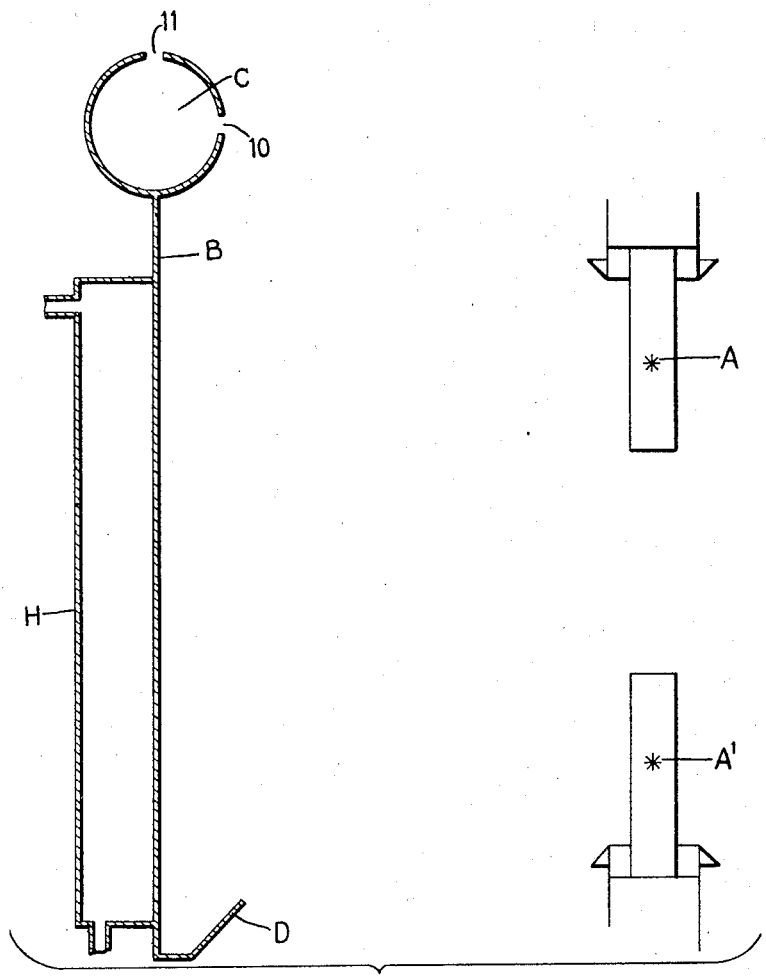
Figure 1 is a diagrammatic representation of a device for carrying out our invention.

In the drawing we show in Figure 1 a surface such as a screen B over which a thin film of liquid to be irradiated is caused to flow by gravity. While the liquid is flowing over the screen B in a thin film it is subject to the radiated energy from any suitable source, for example, the carbon arcs A and A'. The liquid is supplied to the top of the screen on surface B by means of a distributing member C and is collected in any suitable collecting means, such as the trough D. The surface may be provided with a means H for cooling the liquid during irradiation.

We have found that the capacity and character of the film of liquid on the surfaces have a very important effect on the amount of liquid which can be adequately treated on a given length of said surface. We have also found, with limitations, that the thickness of the film varies with the rate of flow or capacity of the film and that there is an interrelationship between these film characteristics and the time necessary to secure a given and constant effect upon the fluid being irradiated. We have also found that the distance of travel of the flowing film is likewise correlated with the constancy of effect of the incident radiant energy.

In order that the film may be maintained of the desired character and thickness, or thicknesses, horizontally, we have provided a method for distributing the fluid to be irradiated to the top portion of the screen. One embodiment of a device suited for carrying out our invention is shown in Figure 1. The distributing chamber C is provided with a narrow slit 10 and a vent 11. The slit 10 is preferably on the side of the distributing chamber, as for example at the horizontal diameter if the chamber is of circular cross-section, or slightly spaced therefrom. It should not be on the bottom although it might be positioned at or near the top, but in such position would not permit as delicate a control. The liquid to be irradiated is supplied to the distributing chamber C by any suitable means which forms no part of the present invention. The liquid is not supplied under any great pressure and does not fill the entire distributing chamber C. The width of the slot 10 is important and is a function of the specific gravity, surface tension and viscosity of the liquid to be irradiated or otherwise treated and possibly of other factors. This width should be sufficiently small that a film of stationary liquid will form across it by capillary attraction when both surfaces of the slot are wetted by the film to be treated. The width of the slot also should be sufficiently large that the liquid will flow through the slot according to the principles of the invention without the necessity of the level of the liquid rising to the vent 11. In using this device the fluid to be irradiated is caused to flow into the chamber C from whence it flows through the slot 10 to the surface B. Due to the fact that the slot 10 is of such width that a surface film will form across it, there is no tendency of the liquid to flow until the liquid has reached a height in the chamber C of sufficient head above the slot C to cause a pressure adequate to overcome the surface and capillary tension forces across the slot. The amount of liquid to be flowed through the slot may be regulated by varying the amount of liquid supplied to the chamber, which produces a slight change in head between the slot 10 and vent 11. We have found that these very small changes in head in the chamber C produce comparatively great changes in the amount of liquid flowing through the slot onto the screen B and also that important and significant features in the characteristics of the flowing film originating from said slot, result. The liquid so flowing follows closely the outside of the chamber C and flows onto the screen B in a film of uniform characteristics, determined by the capacity of the film, temperature and subsequent distance of travel.

Figure 2:
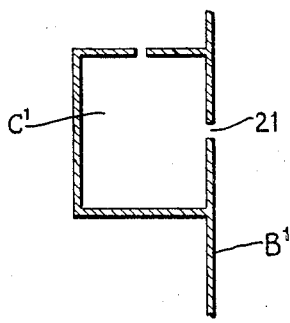
Figure 2 is a detailed cross section of a modified distributing device.

While we have described our invention in connection with a device in which the slot of the distributing chamber projects outwardly from the screen, the invention is not so limited. We may, for example, provide a slot 21 in a screen B' and build up a chamber C' or other suitable distributing means behind the screen as shown in Figure 2.

We have found that establishing a film of uniform character at the line of origin permits a shorter distance of travel, and shorter time of exposure to bring about a given result by the incident radiant energy. Also the establishment of a film of uniform characteristics at the line of origin in the manner described is important in determining the exact character of the film subsequently, after stated or varying distances of travel.

The important of the character of the film of liquid on the screen will be evident when it is considered that the amount of energy and time of treatment are adjusted to give a relatively precise result which accrues from uniform exposure of the components of the fluid being treated. Hence in order to achieve uniform irradiation it is imperative to provide films of uniform characteristics which permit maximum exposure of the components within minimum time commensurate with the desired results.

Due to the inter-action of surface tension, frictional and gravitational forces operative during the course of travel of the film through any specific distance, the character of the film at a given distance from the line of origin will be the resultant of the inter-action of these forces. However, in order that such uniformity in the character of the film may be maintained it is essential that the starting characteristics of the film at the point of origin be carefully controlled. The method and slot device hereinbefore described provides for such control. Films formed in this manner are characterized as wedge shaped, transversely considered (in cross-section), with the widest part at or substantially at the point of origin. The apex of the wedge never reaches zero. The length of the convergence of the free interface varies with the capacity of the film, the viscosity and specific gravity of the fluid being used. The temperature may also have an influence. Depending upon the length of travel, the flowing film may form a series of one or more such wedge-shaped contours.

We have found that by supplying the milk to the surface through a slit as described above and at a rate which may vary from between about 1 to 7 ounces per inch of width per minute, but preferably at about 1 to 3 ounces per inch per minute, one or more of the wedge shaped contours of the film, transversely considered forms during a vertical distance of travel from about 10 to 50 inches. However we prefer in the treatment of milk to regulate the capacity of the film and the intensity of the incident radiation so that the desired result will be obtained during a distance of travel of about 10, but not exceeding about 24 inches thus obtaining a satisfactory degree of antirachitic activation or other desirable effect without detrimental effects which may accrue as a result of greater travel distances and longer exposure periods incident to such greater distances in traveling; likewise we prefer that the desired result be accomplished in the minimum expanse of apparatus area supporting the film. At any rate, and irrespective of the distance of travel required to accomplish the desired result our films subjected to treatment and formed as described are characterized by the wedge shaped form heretofore mentioned with the thinner section of any of the one or more wedge shaped contours further removed from the line of origin of the film than the thicker section of said wedge-shaped contour and wherein the first wedge shaped contour formed by the film is established at the line of origin and wherein the line of origin is taken as the line of reference for establishing the wedge shaped contour or contours of any given film.

These films are not characterized as true turbulent flow type films in the usual sense as applied in defining smooth and turbulent films of fluids. Likewise these films are not horizontally rippled, the free interface detectable or visible to the eye being ripple-free. The films as described present, visually, a smooth substantially mirror like surface and vary in thickness, during the course of travel for a film of any given capacity, by an amount in the order of magnitude of about 0.1 to 0.3 mm. or less. Our films are of uniform character and thickness, horizontally considered but are not to be interpreted as of uniform thickness longitudinally or in the direction of flow.

The characteristic of our film may also be defined in terms of its optical transmission. For example, we have found that a film of desirable capacity and character for optimum treatment with radiant energy is one that transmits at least about 1.5% of an incident radiation of wave about 3000 A., but which does not transmit more than about 10% of such incident radiation, at a distance of about 8 to 10 inches below the point of origin at the slot.

The transmission characteristics of the film may vary beyond these limits at other points of reference on a film of variable or unstated travel distance, without departure from our invention.

Our method of treating fluids, particularly milks, with radiant energy embodies a method of forming films with characteristics as described, wherein such films, while not of uniform thickness vertically and throughout the area of exposure, have smooth surface characteristics; are free from visible ripples or undulations; present at the free interface exposed to the radiant energy one or more wedge shaped surfaces, with the widest part of the transverse thickness at or nearest the line of origin of the film; and wherein the optical properties of the film, at a distance of 8 to 10 inches below the line of origin, is such that at least 1.5% and not more than 10% of the incident radiant energy of the 3000 Å. line of the radiant energy being used will be transmitted.

We claim:

1. A method of irradiating liquids which comprises flowing the liquid through a slit onto a surface, said slit being of such width that the liquid to be treated will always form a film across the slit before liquid can flow through the slit, while applying sufficient force to said liquids to overcome the retarding forces in said film, but insufficient to impart momentum to the liquid such as to cause it to separate from the surface immediately adjacent the lower edge of the slit, said force causing the liquid to flow through the slit in a general direction at an angle to the vertical and at an angle to the direction of flow of the liquid on said surface, and directing ultraviolet energy on the film as it flows over the surface.

2. In an apparatus for irradiating liquids, the combination of means having a surface adapted for flow of the liquid downwardly thereover in the form of a thin continuous flow, a source of radiant energy positioned to impinge radiant energy upon said surface, said means being provided with a slit therethrough near the top of the surface, through which liquid may be supplied to the said surface, and means providing a receptacle to supply liquid for flow through said slit, said slit being located at an elevation between the top and the bottom of the interior of said receptacle, the sides of the slit being so positioned that the general direction of flow of liquid through the slit is at an angle to the vertical and at an angle to the direction of flow of the liquid on said surface, said slit being substantially as long in a horizontal direction as the width of the continuous thin flow for which the said surface is adapted, and being of such width that the liquid to be treated will always form a film across the slit before the liquid can flow through the slit.

3. An apparatus for irradiating liquids as described in claim 2 in which the shape of the surface adjacent the slit is such that liquid flowing beyond the slit is unsupported from beneath.

4. An apparatus for irradiating liquids as defined in claim 2 in which the said surface is a substantially vertical surface and the flow of liquid through the slit is in a generally horizontal direction.

5. A method of irradiating liquids while flowing over a surface which comprises maintaining a body of said liquid, emitting liquid from a side of and at an elevation between the top and bottom of said body of liquid in a direction generally at an angle to the vertical and at an angle to the direction of flow of said liquid over said surface, while retarding forces are operative on the surfaces of the portion of said liquid being emitted, the force applied to emit said liquid being sufficient to cause said liquid to flow against the resistance of said retarding forces but being insufficient to impart momentum such as to cause it to overcome the attraction of said liquid for said surface, whereby the flowing liquid is adherent to the said surface below and immediately adjacent the place of emission, and directing ultraviolet energy on the liquid as it flows over the surface.

6. A method of irradiating milk as defined in claim 5 in which the milk to be irradiated flows onto a substantially vertical smooth surface at a rate of about 1 to 7 ounces per inch per minute while the ultraviolet energy is directed against it as it flows over the said surface.

7. A method of irradiating milk as defined in claim 5 in which the milk to be irradiated flows upon a substantially vertical surface at a rate such that the film of milk transmits at least 1.5% but not more than 10% of an incident radiation having wave lengths of 3000 Å at a distance of about 8 to 10 inches from the line of origin of the film being irradiated by the ultraviolet energy.

8. A method of irradiating milk as defined in claim 1 in which the milk to be irradiated flows onto a substantially smooth surface at a rate of about 1 to 7 ounces per inch per minute, the film being of such character that it transmits at least 1.5% but not more than 10% of an incident radiation having wave lengths of 3000 Å. at a distance of about 8 to 10 inches from the line of origin of the film being irradiated by the ultraviolet energy.

9. A method of irradiating milk as defined in claim 5 in which the milk to be irradiated flows onto a substantially vertical smooth surface at a rate of about 1 to 7 ounces per inch per minute while the ultraviolet energy is directed against it as it flows over the said surface through a vertical distance of about 10 to 50 inches from the line of origin of the film.

10. A method of irradiating milk as defined in claim 5 in which the milk to be irradiated flows onto a substantially vertical smooth surface at a rate of about 1 to 7 ounces per inch per minute while the ultraviolet energy is directed against it as it flows over the said surface through a vertical distance of about 10 to 24 inches from the line or origin of the film.

11. A method of irradiating milk as defined in claim 5 in which the milk to be irradiated flows upon a substantially vertical surface at a rate such that the film of milk transmits at least 1.5% but not more than 10% of an incident radiation having wave lengths of 3000 Å. at a distance of about 8 to 10 inches from the line of origin of the film being irradiated by the ultraviolet energy, said film flowing through a vertical distance of about 10 to 24 inches from the line of origin of the film while being irradiated.

12. A method of irradiating milk as defined in claim 5 in which the milk to be irradiated flows onto a substantially vertical smooth surface at a rate of about 1 to 3 ounces per inch per minute while the ultraviolet energy is directed against it as it flows over the said surface.

13. A method of irradiating liquids as defined in claim 5 in which the liquid to be irradiated flows onto the surface to provide a wedge-shaped film on the surface, said film having its thickest part at or near the slit and extending in substantially a wedge shape throughout a distance of about 10 to 50 inches from the line of origin of the film.

GEORGE C. SUPPLEE.
MERRILL J. DORCAS.

CERTIFICATE OF CORRECTION.

Patent No. 2,202,611.  May 28, 1940.

GEORGE C. SUPPLEE, ET AL.

It is hereby certified that error appears in the printed specification of the above numbered patent requiring correction as follows: Page 2, second column, line 10, for the word "important" read --importance--; page 3, first column, line 25, for "about" read --length--; line 27, for "point" read --line--; line 57, claim 1, for the word "liquids" read --liquid--; page 4, first column, line 10, claim 10, for "or" read --of--; and that the said Letters Patent should be read with this correction therein that the same may conform to the record of the case in the Patent Office.

Signed and sealed this 6th day of August, A. D. 1940.

(Seal)

Henry Van Arsdale,
Acting Commissioner of Patents.